United States Patent
Mizukoshi et al.

[15] 3,661,031
[45] May 9, 1972

[54] VARIABLE GEAR RATIO STEERING GEARING

[72] Inventors: Yasumasa Mizukoshi; Masato Yanagimoto, both of Fujisawa-shi, Japan

[73] Assignee: Nippon Seiko Kabushiki Kaisha, Tokyo, Japan

[22] Filed: Apr. 24, 1969

[21] Appl. No.: 818,968

[30] Foreign Application Priority Data

May 2, 1968 Japan..................................43/29117

[52] U.S. Cl..............................................................74/462
[51] Int. Cl..................................................F16h 55/06
[58] Field of Search.......................90/10; 74/462, 498, 499

[56] References Cited

UNITED STATES PATENTS

| | | | |
|---|---|---|---|
| 3,267,763 | 8/1966 | Merritt | 74/498 X |
| 3,500,699 | 3/1970 | Matsuda | 74/498 |
| 2,159,225 | 5/1939 | Phelps et al | 74/499 |
| 2,953,932 | 9/1960 | Lincoln | 74/388 PS |
| 3,310,990 | 3/1967 | Zettel | 74/409 |

Primary Examiner—Leonard H. Gerin
Attorney—Marn & Jangarathis

[57] ABSTRACT

This invention provides an improved variable gear ratio steering gear for vehicles comprising a ball nut which has a rack on one side and moves in the axial direction of a worm, as the worm, connected to a steering shaft, rotates, and a sector gear meshed with said rack. According to this invention, the sector gear is formed by using a rack type gear cutter having blades symmetrically located at two places on the right and left sides of the center position of the sector gear when the vehicle is in its straight ahead position and provided with equal amount of lateral transposition, and the ball nut has the rack to be meshed with the sector gear having nearly the same tooth form as that of said rack type gear cutter.

1 Claim, 13 Drawing Figures

VARIABLE GEAR RATIO STEERING GEARING

This invention relates to a ball screw type steering gear for automobiles, particularly to a manual steering device which has a ball nut with the rack on one side and designed to move in the axial direction as a worm shaft connected to the steering shaft rotates, and a sector gear mating with said rack.

In the manual ball screw type steering device, it is advisable to provide a small gear ratio near the center of the sector gear, i.e., near the position where the front wheels are pointing straight ahead, in order to insure high steering stability during high-speed running and, at the same time, to provide a large gear ratio to permit light and smooth steering when turning the front wheels. Namely, the steering gear should be so designed that the gear ratio is small when the sector gear operating angle is zero; the gear ratio increases with increasing angle in either direction; and over the prescribed degree of angle, the gear ratio is large and fixed. This is well known in the art.

An object of the present invention is to provide a variable gear ratio steering gear incorporating a sector gear which has sufficient strength and an ideal tooth form for engagement with the ball nut.

Another object is to provide a steering gear which has an ideal gear ratio to fulfil the requirements of steering and furthermore requires no modification of the tooth form.

To fill these objects, the sector gear of the steering gear of this invention is produced by using a rack type gear cutter with blades having the equal amount of lateral transposition arranged symmetrically at two places on the right and left sides of the center position of the sector in the straight ahead position of the vehicle. The ball nut is provided with a rack having much the same tooth form as the aforementioned rack type gear cutter and engaged with the sector gear.

The present invention will be described more in detail referring to the drawings, in which.

Figure 5:
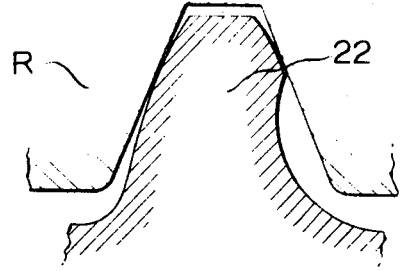
Figure 6:
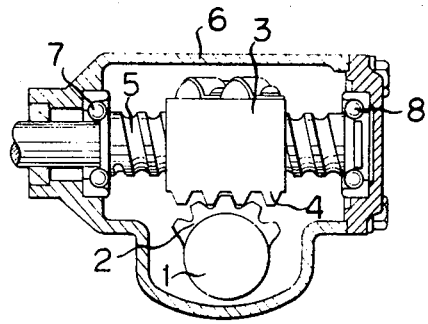
Figure 7:
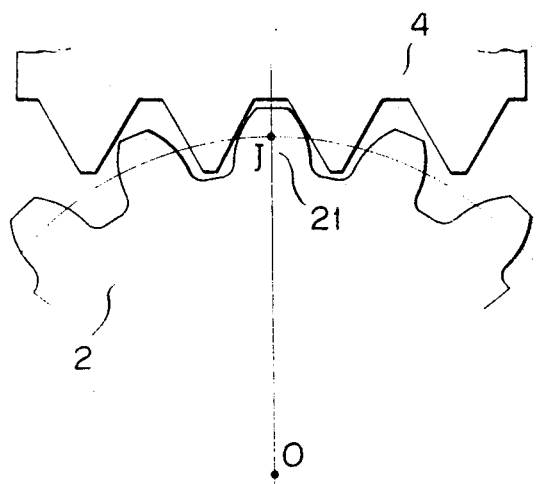
Figure 8:
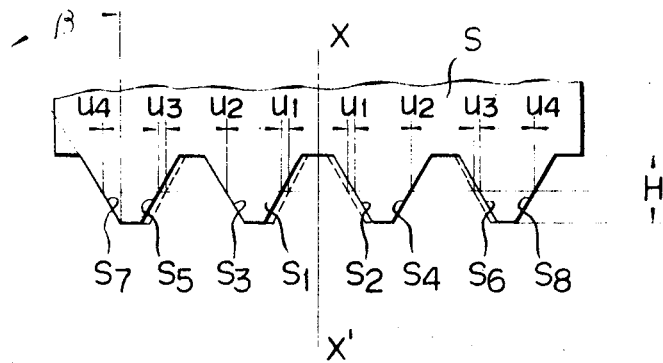
Figure 9:
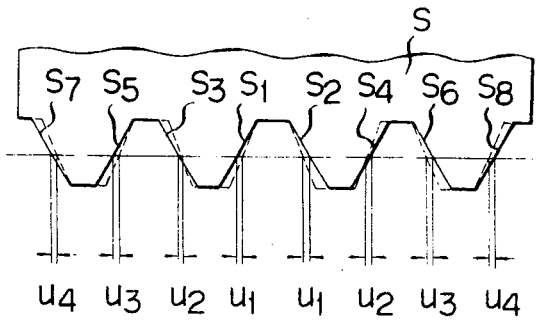
Figure 10:
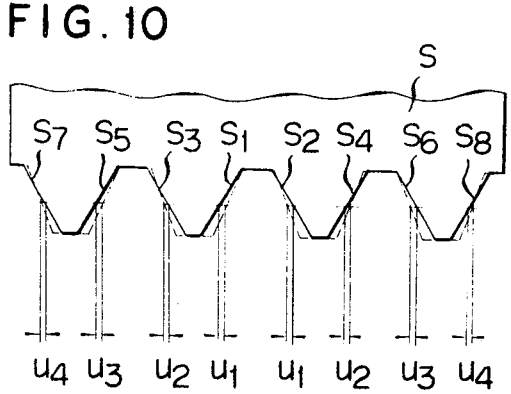
Figure 11:
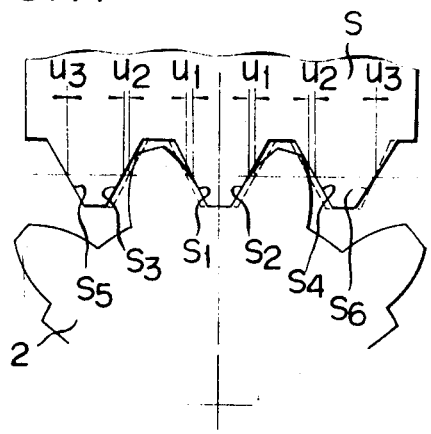
Figure 12:
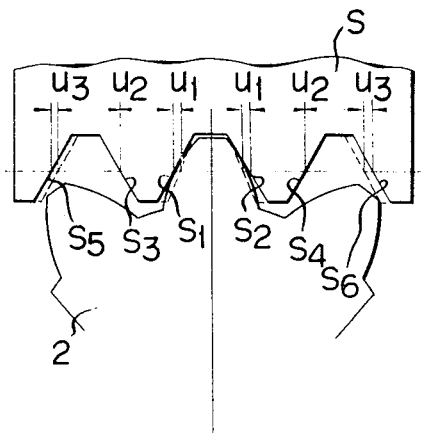
Figure 13:
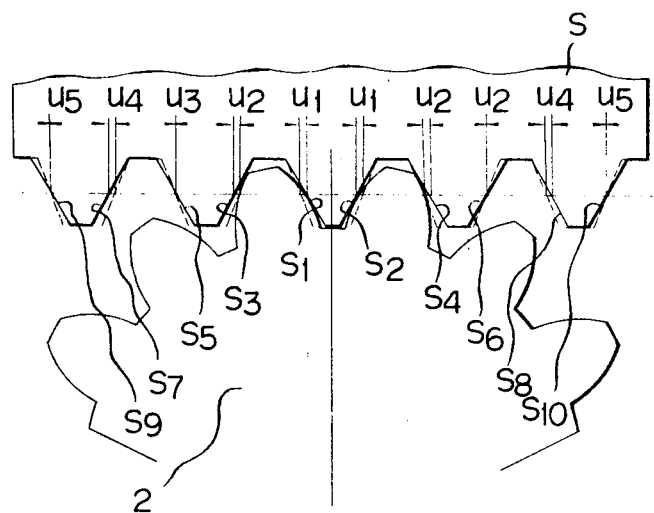

FIG. 5 is a plan view showing a tooth between the central tooth and the outermost tooth, and a part of the gear cutter; and FIGS. 6 through 13 are examples of the present invention, that is, FIG. 6 is a cross-sectional view of the steering gear; FIG. 7 is a partial plan view showing a ball nut and the sector gear in engagement; FIGS. 8 and 9 show the shape of blades of the rack type gear cutter; FIG. 11 through FIG. 13 show the shape of blades of the rack type gear cutter in the case that the number of teeth of the sector gear differs from that shown in the example in FIG. 6.

Figure 1:
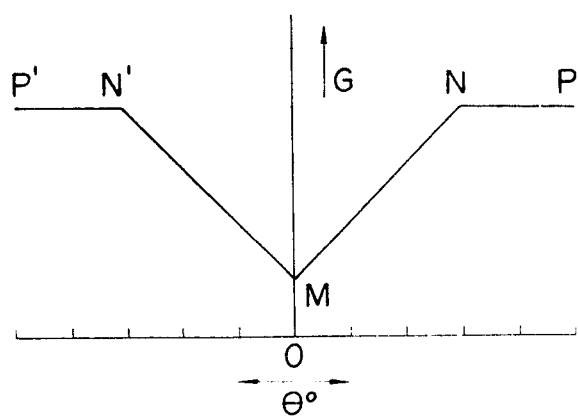
FIG. 1 is a diagrammatic representation showing the variation of gear ratios of a manual steering gear, with the operating angle of a sector gear plotted on the axis of abscissas and the gear ratio on the axis of ordinates.

FIG. 1 shows diagrammatrically the variation of gear ratios of a manual steering gear, with the operating angle of a sector gear plotted on the axis of abscissas and the gear ratio on the axis of ordinates. The steering gear should be so designed that, as shown in FIG. 1, the gear ratio $G$ is small when the sector gear operating angle $\theta$ is zero; the gear ratio $G$ increases with increasing angle $\theta$ in either direction; and over the prescribed degree of angle, the gear ratio is large and fixed.

Figure 2:
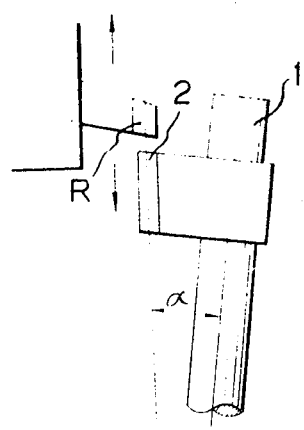
FIG. 2 is a side elevation showing sector gear cutting operation.
Figure 3:
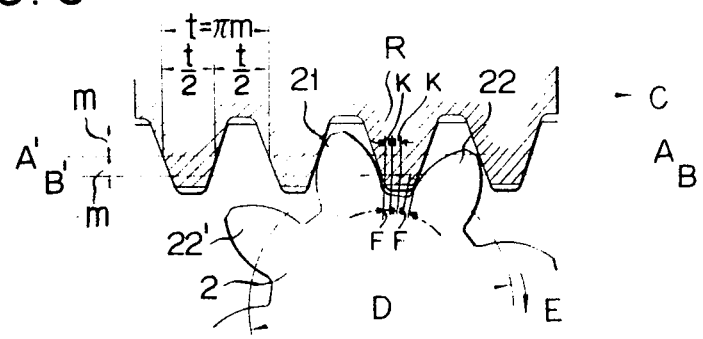
FIG. 3 is a plan view showing the sector gear cutting operation.

Now, let $L$ be the lead of the worm, $D$ be the diameter of the pitch circle of the sector gear, and $\pi$ be the circular constant, and the gear ratio G of the ball screw type steering gear can be given by $G = \pi D/L$. The worm is constantly meshed with the ball nut through balls inserted in the ball nut screw grooves; and therefore it is impossible to change the lead $L$ by changing the axial position of the ball nut, and so it is imperative to always maintain the lead $L$ at a constant value. It is quite manifest that there is no other way than changing the diameter $D$ of the pitch circle to change the gear ratio $G$. To produce the sector gear of the involute tooth form by using the rack type gear cutter, the sector shaft 1 is mounted inclined at an angle $\alpha$ off the perpendicular as shown in FIG. 2 because the sector gear is a taper gear that permits the adjustment of backlash; the basic rack type gear cutter R, whereby the thickness of each tooth of the rack on the standard pitch line AA' will be made one half of the pitch $t$ as shown in FIG. 3, is moved straight in the direction of the arrow C by the travel K on the gear cutting pitch line BB' in order to turn the sector gear 2 in the direction of the arrow E by the travel F on the standard pitch line; and in this position, the basic rack type gear cutter R is moved up and down once to make the travel K equal to the travel F and this operation is repeated, thus producing the conventional type of sector gear having the equal gear ratio. When cutting a sector gear by changing the gear ratio, the sector gear travel F must be less than the gear cutter travel K on either side of the zero position of the sector gear operating angle $\theta$. Increasing the value of this travel K proportionally can vary the gear ratio as shown by the lines MN and MN' in FIG. 1. On the lines NP and N'P', travels, i.e. transfer distances, F' and K' should be larger than said travels F and K, respectively, but equal to the transfer distance of the cutter at the points N and N', and F' is made equal to K' so as to obtain the equal gear ratio.

Figure 4:
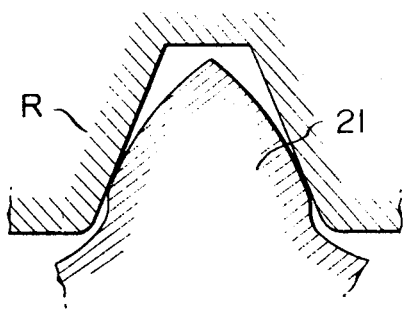
FIG. 4 is a plan view showing the central tooth of the sector gear formed by a standard rack type gear cutter, and a part of the gear cutter.

In the case of the conventional sector gear of equal gear ratio, if, in FIG. 3, the operating angle of the sector gear 2 which gives the travel F on the standard pitch circle is $\theta°$, then $F = \pi D/360 \cdot \theta°$ and $F = K$; and the pitch circle diameter at a position where the sector rotates $\theta°$ is D'. If the travel K is increased larger than the travel F, which is kept unchanged, that is, with $\theta°$ kept unchanged, to produce the sector gear 2 having a variable gear ratio, D, becomes larger than D; and consequently it is understandable from the aforementioned formula $G = \pi D/L$ that the gear ratio $G$ varies largely. As previously stated, the gear ratio of the sector gear 2 can be varied with the change of the sector gear operating angle $\theta$ by using the basic rack type gear cutter R. In this case, however, since the travel K of the basic rack type gear cutter R is larger than the travel F of the sector gear 2, the gear cutter tends to precede the sector gear 2; and accordingly the cutting blade tends to cut excessively but the blade on the opposite side tends to cut insufficiently, leaving stock still to be cut off. Thus the central tooth 21 of the sector gear is tapered at the crest and thick at the root as shown in FIG. 4, and at the same time there takes place a similar phenomenon as "undercut." Also, the outside teeth 22 and 22' adjacent to the central tooth 21 are scraped too much at the surface because the basic rack type gear cutter precedes largely. FIG. 5 shows the right outside tooth 22. The left outside tooth 22' also is scraped at the opposite side surface symmetrically. The sector gear having such defective teeth not merely has less strength but also results in undesirable gear mesh, becoming so fatal defect that it is no more usable as an important safety part in the vehicle. Maintenance of the prescribed strength despite the inferior tooth form will encounter such a problem that there will become of necessity to employ large gear teeth on the whole, or that it will be difficult to fully meet all the requirements of sector gear performance due to the limited range of applicable gear ratio, namely the limited difference in gear ratio between the point M and the points N and N' in FIG. 1.

FIG. 6 shows an example of this invention. The ball nut 3 has the rack 4 on one side mating through balls with the worm 5 connected to the steering shaft and slides in the axial direction with the rotation of the worm 5; and the worm 5 is freely rotatably attached to the gear box 6 through worm bearings 7 and 8. The ball nut rack 4 is meshed with the sector gear 2 installed on the sector shaft 1; and therefore as the steering shaft is turned, the sector shaft 1 is rotated to turn the front wheels in either direction to change the direction of the vehicle. FIG. 7 is a partly enlarged view of the ball nut rack 4 and the sector gear 2 on the sector shaft, mating in the center position. The rack 4 has four teeth, while the sector gear 2, five teeth. This sector gear 2 is cut in the same manner by the rack type gear cutter S shown in FIG. 8 as the aforementioned standard rack type gear cutter R. The four teeth of the rack type gear cutter S are of the same height H and of the same pressure angle $\beta$. However, the equal amount of lateral transposition $U_1$, $U_2$, $U_3$ and $U_4$ are provided to each two blades, e.g., $S_1$ and $S_2$, $S_3$ and $S_4$, $S_5$ and $S_6$ and $S_7$ and $S_8$, located symmetrically on both sides of the center position of the sector gear 2 where the front wheels are pointing straight ahead, that is, on the right and left sides of the straight line XX' produced from the straight line OJ drawn between the center O of the sector shaft 1 and the center J of the central tooth 21 of the sector gear. The tooth form indicated by the dotted line is that of the standard rack type gear cutter R before profile shift. In FIG. 8, $U_1 > U_3$ and $U_2 = U_4 = 0$. These four blades $S_3$, $S_4$, $S_7$ and $S_8$ are not profile-shifted. FIG. 9 and FIG. 10, however, show the rack type gear cutter S with their blades profile-shifted in a reverse direction at $U_2$ and $U_4$ respectively. The pressure angle of the rack type gear cutter also is larger than that of the standard rack type gear cutter R. The abovementioned shift position $U_1$, $U_2$, $U_3$ and $U_4$ are determined appropriately according to the variable gear ratio and various other requirements of the gear. The ball nut rack 4 meshed with the sector gear 2 thus produced by the rack type gear cutter S which is set as described above, has the teeth that are of much the same tooth profile as those of the rack type gear cutter S but are made smaller in thickness within the range that an appropriate backlash can be maintained in engagement with the sector gear 2.

FIG. 11 shows another form of the sector gear 2 with four teeth, indicating that the three teeth of the rack type gear cutter S are of the same height and pressure angle as those shown in FIG. 8 and those in FIG. 12 and FIG. 13; the two blades located symmetrically on the right and left sides are $S_1$ and $S_2$, $S_3$ and $S_4$ and $S_5$ and $S_6$; and the amount of lateral transposition $U_3$ provided to the blades $S_5$ and $S_6$ is zero.

FIG. 12 shows another example of the sector gear 2 with three teeth, indicating that the rack type gear cutter S consists of two perfect teeth and two imperfect teeth having only one blade outside of the respective perfect teeth; $S_1$ and $S_2$, $S_3$ and $S_4$ and $S_5$ and $S_6$ are blades located symmetrically on the right and left sides; and the amount of lateral transposition $U_2$ provided to the blades $S_3$ and $S_4$ is zero.

FIG. 13 illustrates further another form of the sector gear 2 having six teeth; the rack type gear cutter S for use in cutting the sector gear has five teeth. Blades located symmetrically on both the right and left sides are $S_1$ and $S_2$, $S_3$ and $S_4$, $S_5$ and $S_6$, $S_7$ and $S_8$ and $S_9$ and $S_{10}$. This example shows the rack type gear cutter S with teeth having a different pressure angle. This is adopted for the purpose of reducing "undercut" by increasing the pressure angle, which shall be adopted in accordance with the requirements of the gear.

In these examples described above, the ball nut rack 4 has the teeth which are of nearly the same tooth form as those of the rack type gear cutter S but are made smaller within the range that an appropriate backlash can be maintained in engagement with the sector gear 2.

As previously stated, the sector gear of the steering gear of the present invention is produced by the rack type gear cutter with the blades which have the equal amount of lateral transposition and located symmetrically at two places on both the right and left sides, thus eliminating the defect that the central tooth of the sector gear is tapered at the crest and thick at the root and further the defect that the outer surface of each outside tooth adjacent to the central tooth is scraped. The other advantage is that the variable gear ratio steering gear thus produced is provided with the sector gear having sufficiently strong teeth of ideal tooth form suited for mating with the ball nut. Another advantage is that the sector gear, meshed with the ball nut rack having nearly the same tooth form as the rack type gear cutter to permit smooth steering, is dependable and suited for use as an important safety part. Another advantage is the capability of providing an ideal gear ratio that meets all the requirements of performance by setting the amount of lateral transposition of each blade of the rack type gear cutter. Still another advantage is that there is no necessity to adopt a large sector gear to maintain strength.

What is claimed is:

1. In a manual operating ball screw type steering gearing for vehicle having a ball nut which has a rack on one side and moves in the axial direction of a worm as the worm connected to a steering shaft rotates and a sector gear meshed with said rack, an improvement comprising said sector gear having teeth symmetrically located at two places on the right and left sides respectively of the center position of said sector gear where the vehicle is in its straight ahead position and which are provided with equal amount of lateral transposition, whereby the thickness of teeth on either side of the central tooth on said sector gear is modified, in the absence of any change in tooth symmetry or pressure angle and said ball nut has the rack of nearly the same tooth form as that of the rack type gear cutter used to produce said sector gear and is meshed with said sector gear.

* * * * *